United States Patent [19]
Crayford

[11] Patent Number: 5,859,837
[45] Date of Patent: Jan. 12, 1999

[54] FLOW CONTROL METHOD AND APPARATUS FOR ETHERNET PACKET SWITCHED HUB

[75] Inventor: Ian Crayford, San Jose, Calif.

[73] Assignee: Advanced Micro Devices Inc., Sunnyvale, Calif.

[21] Appl. No.: 480,497

[22] Filed: Jun. 7, 1995

[51] Int. Cl.$^6$ ..................................................... H04J 3/14
[52] U.S. Cl. ......................... 370/230; 370/425; 370/446
[58] Field of Search .................. 370/85.2, 85.3, 370/94.3, 58.1, 58.2, 58.3, 60, 61, 85.6, 94.1, 85.7, 425, 230, 252, 351, 389, 392, 407, 416, 522, 445, 446, 447, 448, 426

[56] References Cited

U.S. PATENT DOCUMENTS

| | | |
|---|---|---|
| 4,500,990 | 2/1985 | Akashi . |
| 5,140,585 | 8/1992 | Tomikawa ............................... 370/425 |
| 5,177,788 | 1/1993 | Schanning, et al. . |
| 5,285,449 | 2/1994 | Georgion ............................. 370/85.13 |
| 5,305,321 | 4/1994 | Crayford . |
| 5,351,241 | 9/1994 | Yehonatan .............................. 370/94.3 |
| 5,453,980 | 9/1995 | Van Engelshoven ................... 370/404 |
| 5,469,439 | 11/1995 | Thaler et al. ........................... 370/94.3 |
| 5,491,697 | 2/1996 | Christensen et al. ................ 370/85.13 |
| 5,546,385 | 8/1996 | Caspi et al. ............................. 370/412 |

FOREIGN PATENT DOCUMENTS

| | | |
|---|---|---|
| A0529774 | 3/1993 | European Pat. Off. . |
| A0648034 | 4/1995 | European Pat. Off. . |

OTHER PUBLICATIONS

Inai, H. and Ohtsuki, K., "Performance Study of Congestion Control for High–Speed Backbone Networks," *Computer Communications*, vol. 15, No. 7, pp. 429–437 Sep. 1992, London, GB.

*Primary Examiner*—Huy D. Vu
*Attorney, Agent, or Firm*—Townsend and Townsend and Crew LLP

[57] ABSTRACT

A flow control enabled Ethernet switch that applies backpressure to input ports that attempt to transmit a data packet to a busy destination port. The backpressure is a phantom packet that activates the IEEE 802.3 collision detection system to abort transmission of the data packet. A subsequent series of phantom packets (that are invalid) provide carrier activity that inhibits retransmission of the packet. When the destination port is available, the phantom packets are stopped, permitting standard retransmission of the data packet. The switch includes prioritization mechanisms (e.g., a throttle count) to use when awarding priority to a port having backpressure applied.

14 Claims, 4 Drawing Sheets

FLOW CONTROL METHOD AND APPARATUS FOR ETHERNET PACKET SWITCHED HUB

CROSS-REFERENCE TO RELATED APPLICATIONS

This application is related to "ENHANCEMENTS TO 802.3 MEDIA ACCESS CONTROL AND ASSOCIATE SIGNALING SCHEMES FOR FULL DUPLEX ETHERNET," U.S. patent application Ser. No. 08/483,501 filed Jun. 7, 1995, "AUTO NEGOTIATION SYSTEM FOR A COMMUNICATIONS NETWORK," U.S. patent application Ser. No. 08/161,707 filed Dec. 3, 1993, "ETHERNET MEDIA ACCESS CONTROLLER WITH EXTERNAL ADDRESS DETECTION INTERFACE AND ASSOCIATED METHOD," U.S. Pat. No. 5,305,321, and "EXPANDABLE PORT MOBILITY FOR NETWORK REPEATER," U.S. patent application Ser. No. 08/409,820 filed Mar. 23, 1995 all hereby expressly incorporated by reference for all purposes.

BACKGROUND OF THE INVENTION

The present invention relates generally to data packet switches used in computer local area networks, and more specifically to a method and apparatus for implementing flow control of packets directed to a switch in such a computer network.

Networks of computers are commonly used in today's business environment. One common network system structure uses one or more repeaters. The repeater typically includes several ports. A particular data packet received at one port is retransmitted to the other ports of the repeater. Each repeater restores timing and amplitude degradation of data packets received on one port and retransmits them to all other ports, and hence over the network. For networks employing a CSMA/CD-type of network, such as an Ethernet network, every data packet passes through every repeater. Network administrators are thereby able to conveniently use each repeater as a device on the network from which to gather information concerning the operation of the network.

In traditional Ethernet (802.3 10BASE5) and Cheapernet (802.3 10BASE2), a coaxial cable provides a linear bus to which all nodes of a local area network are connected. A standard promulgated by the IEEE (IEEE Standard 802.3) defines various functionality for computer networks. This standard is expressly incorporated by reference for all purposes. Signaling is accomplished using a current synch technique wherein a center conductor of the coaxial cable is used for a signal and a shield conductor of the coaxial cable is used for a reference voltage (typically ground). Twisted pair Ethernet (802.3 10BASE-T) uses a standard voice grade telephone cable rather than the coaxial cable. The telephone cable uses separate pairs of conductive wires for transmission and reception.

When using twisted pair Ethernet, the network configuration is a star topology. The star topology provides for several end stations or data terminal equipment (DTE) devices all coupled to a multi-port repeater located at a center of the star. The repeater performs signal amplitude and timing restoration. The repeater receives a bitstream at one of its ports and restores signal amplitude levels and timing requirements to all appropriate output ports. The repeater repeats the reshaped and retimed input bitstream to all of its other ports. In one sense, the repeater acts as a logical coaxial cable, permitting every node connected to the twisted pair network to receive each transmission from any other node, just as when a coaxial cable is used. The pairs of conductors use differential signaling, one pair for transmission and another pair for reception.

While a repeater is used in a traditionally wired coaxial Ethernet network as a mechanism to extend the physical distance limit of the network, in the IEEE 802.3 10BASE-T, the standard mandates the use of a repeater to provide connectivity between nodes whenever more than two nodes are present. Although physical signaling on the cabling differs between the traditional Ethernet-type of repeater and the twisted pair-type of repeater, the functionality of the repeaters are identical, as is the frame or packet format that is used to pass messages between the participating nodes on the network.

The packet commences with a preamble sequence which is an alternating ("1" and "0") pattern. The preamble sequence provides a single frequency on the network, in this case five MegaHertz (MHz) at the start of each frame, allowing a receiver to acquire and lock onto the associated bitstream. The preamble sequence is followed by a start of frame identifier that immediately precedes the data portion of the transmission. Either a start of frame delimiter (802.3) or synch sequence (Ethernet) delineates the start of the data portion of the message. Following the start of frame identifier are two address fields: a destination address (DA) and a source address (SA). These addresses are both forty-eight bit values and are transmitted least significant bit (LSB) first.

A media access controller (MAC) associated with each DTE uses the destination address to determine whether an incoming packet is addressed to the node it is associated with. When a receiving node detects a match between its own node address and an address transmitted in the destination address field, it attempts to receive the packet. Nodes having a MAC that does not detect a matching address typically ignore a remainder of the packet.

There are three types of destination addressing supported by the 802.3 standards:

1. Individual. The DA field contains an individual and unique address assigned to a single node on the network.

2. Multicast. When the first bit (LSB) of the DA is set, the remainder of the DA includes a group address. The group of nodes that are actually addressed is determined by a higher layer function. In general, use of a group address is designed to transmit a message to a logically similar subset of nodes on the network.

3. Broadcast. The broadcast is a special form of multicast address wherein the DA field is set to all "1's." This address is reserved, and all nodes on the network must be capable of receiving a broadcast message.

The MAC that transmits a data packet writes its own address into the SA field. This allows the transmitting MAC to identify those packets which it originates. The 802.3 standards do not require that a receiving MAC take any action based upon the SA field. In some applications, such as management, security or configuration, the SA field may be tracked and monitored.

A two-byte length/type field follows the SA field. The choice of length or type is dependent upon whether the frame is compatible with the IEEE 802.3 or the Ethernet standard. The higher order byte of the length/type field is transmitted first, with the LSB of each byte transmitted first.

A data field contains actual packet data that is transferred between end stations and is between forty-six to fifteen hundred bytes in length. A logical link control (LLC) function is responsible for fragmenting data into block sizes suitable for transmission over the network. Data bytes are transmitted sequentially with the LSB of each byte transmitted first.

A frame check sequence (FCS) is a four-byte field that contains a cyclic redundancy check (CRC) for the entire frame. The transmitting station computes the CRC throughout the DA, the SA, the length/type field, and data field. The transmitting station appends the FCS as the last four bytes of the frame. A receiving station uses the same CRC algorithm to compute the CRC for a received frame. The receiving station compares the CRC value it computes with the CRC value in the transmitted FCS. A mismatch indicates an error, such as a corrupted data frame. CRC bits of the FCS are transmitted in order: most significant bit (MSB) to LSB.

FIG. 1 and FIG. 2 are diagrams illustrating formats for an IEEE 802.3 Standard compliant packet and an Ethernet packet, respectively. Comparing the packet formats illustrates that a primary difference between the packet types is that the start of frame delimiter (SFD) for 802.3 is defined as a byte that has a "1 0 1 0 1 0 1 1" pattern whereas the start frame (synch) of Ethernet is a "11" sequence. Even so, in both cases, a total number of bits for the preamble plus the start of frame indication is sixty-four bits long.

The 802.3 and Ethernet standards both specify that a frame must be in the range of sixty-four to fifteen hundred eighteen bytes (excluding preamble/SFD). However, the actual data field in the 802.3 system is permitted to be smaller than the forty-six byte value that is necessary to ensure this minimum size. To handle a smaller size data field, the MAC of a transmitting station appends pad characters to the LLC data field before sending data over the network. The Ethernet standard assumes that an upper layer ensures that the minimum data field is forty-six bytes before passing data to the MAC, therefore the existence of appended pad characters in unknown to the MAC implementing an Ethernet format.

The 802.3 standard also uses a length field that indicates the number of data bytes that are in the data field only. Ethernet, on the other hand, uses a type field in the same two bytes to identify the message protocol type. Since valid Ethernet type fields are always assigned outside of the valid maximum 802.3 packet length size, both 802.3 and Ethernet packets can coexist on the same network. Hence, it has been found that it is important to be able to track and monitor the addresses for a variety of reasons. For example, as networks change in the number of nodes attached thereto, it becomes important to be able to associate an address with a particular port or the like within the network.

To further provide background information, it is useful to consider the concept of a collision domain. A collision domain is a collection of nodes and end-stations that collectively access a total bandwidth available when using CSMA/CD protocol. The CSMA/CD system provides a mechanism to detect a collision condition (when more than one device on the network attempts to transmit at the same time).

CSMA/CD devices detect when collisions exist and provide procedures to control the various devices so that one data packet is transmitted at a time within the collision domain. For example, with Ethernet, detection of a collision event causes each end-station that tried to transmit when the collision was detected to implement a back-off algorithm. The back-off selects a period for the particular end-station to wait before trying to transmit again. Since several different values are possible, the interfering end-stations eventually will select different values resulting in one of the end-stations transmitting its data packet.

An additional control mechanism is provided by carrier detection. End-stations are not allowed to transmit packets into their collision domain if another end-station is transmitting into the collision domain. End-stations determine whether another end-station is transmitting by the carrier detection mechanism, as well known.

As computing power and bandwidth needs of the individual end-stations increase, it becomes increasingly easy for a collision domain to become saturated, resulting in inefficient operation of the network and inefficient operation of the end-stations trying to access various resources over the network.

A solution that various network administrators have used in order to reduce network congestion segments end-stations into multiple collision domains. As each domain gets a full allocation of the relevant network bandwidth, the various segmented collision domains have improved operation. For an end-station having particularly high bandwidth requirements, it is possible to segment it into its own collision domain.

Often, the various autonomous collision domains will exchange information. Special devices, such as a switch or bridge, exist in multiple collision domains and route data packets between the various collision domains. In designing these special devices, it is important that they do not significantly degrade the performance of the collision domains that they transfer messages between while efficiently transporting inter-domain packets to the proper destinations. In general, collisions within one collision domain are not propagated to any other collision domain. Only valid packets destined for a destination in another collision domain will be forwarded.

SUMMARY OF THE INVENTION

The present invention provides apparatus and method for simply, efficiently and economically providing flow control in a half-duplex Ethernet switch. One advantage of the preferred embodiment is that it can be used in an existing switch implementation which provides multiple input or output buffers. The implementation is able to reduce the number of input/output buffers, while preserving the original data path of the design. Only minimal additional logic is required for the additional functionality to reduce the buffering requirements substantially. The preferred embodiment allows virtually any switch architecture to be accommodated, regardless of whether the switch provides dedicated or shared input/output queue structures, or even whether it is memory based or bus based. In effect, the described mechanisms of the preferred embodiments allow switch optimization according to available buffering and aggregate bandwidth of the switch fabric.

For instance, in an output queued switch, output buffering can be reduced. Flow control indicators are only generated to indicate that no current output buffer exists. In essence, backpressure flow control is generated when no output buffers for the output port are available. Similarly, in an input queued switch, the input buffering can be reduced, and the flow control indicators used to signal that no current input buffer(s) exist. For a time-division multiplexed (TDM) bus based switch, the flow control indicators signal that no currently available slot on the TDM bus is available.

According to one aspect of the invention, it includes a method of switching an input data packet received at a first port of a half-duplex Ethernet switch to a second port of the half-duplex Ethernet switch having an communication channel established between the second port and a third port of the half-duplex Ethernet switch. The preferred embodiment of the invention includes the steps of:

determining whether to block the input data packet; thereafter applying backpressure from the first port when blocking is desired;

providing a carrier sense signal derived from the communication channel to the first port; thereafter receiving the input data packet at the first port when said carrier sense signal indicates said communication channel is closed and the second port is available; and thereafter routing the input data packet from the first port to the second port.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings. In the drawings, like reference numbers indicate identical or functionally similar elements.

DESCRIPTION OF THE PREFERRED EMBODIMENT

Figure 1:
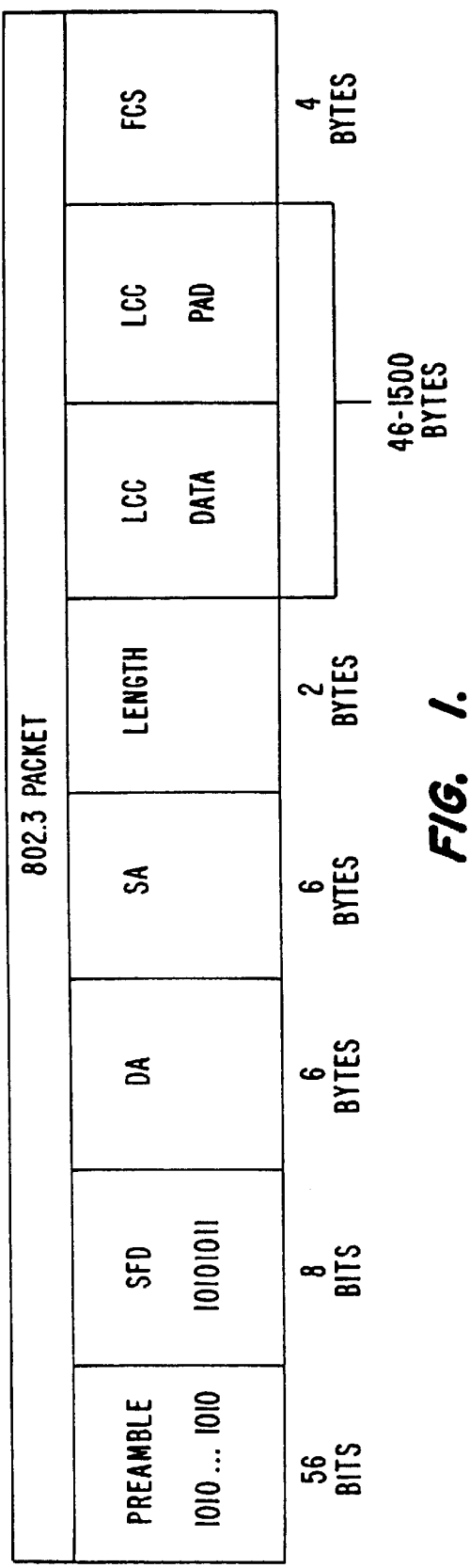
FIG. 1 is a diagram illustrating a format for an IEEE 802.3 Standard compliant packet.
Figure 2:
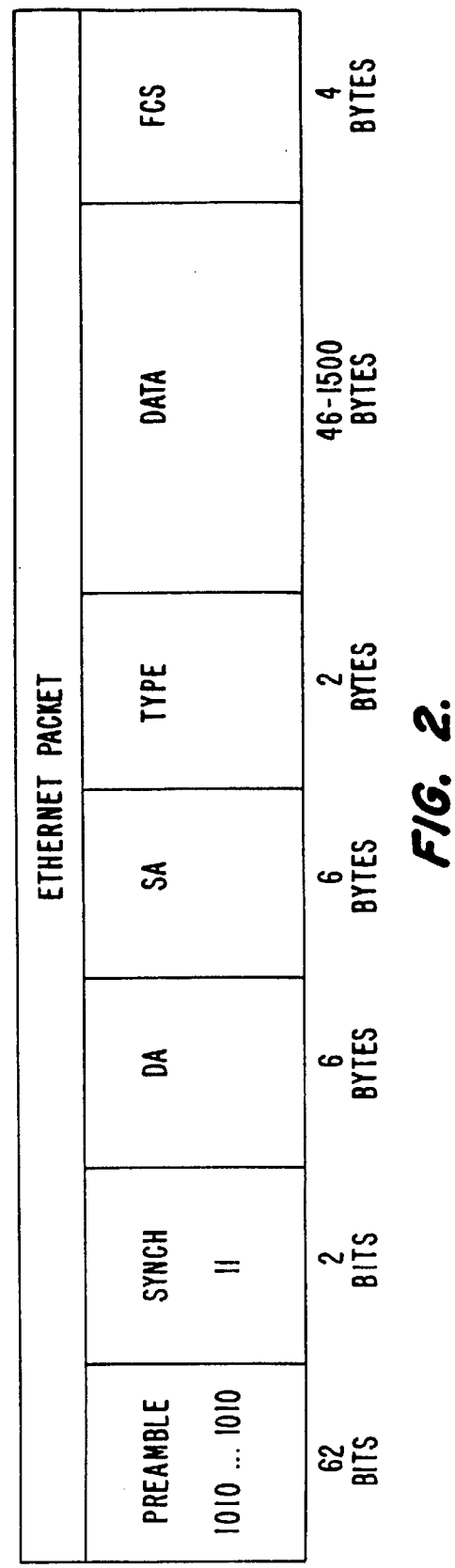
FIG. 2 is a diagram illustrating a format for an Ethernet packet.
Figure 3:
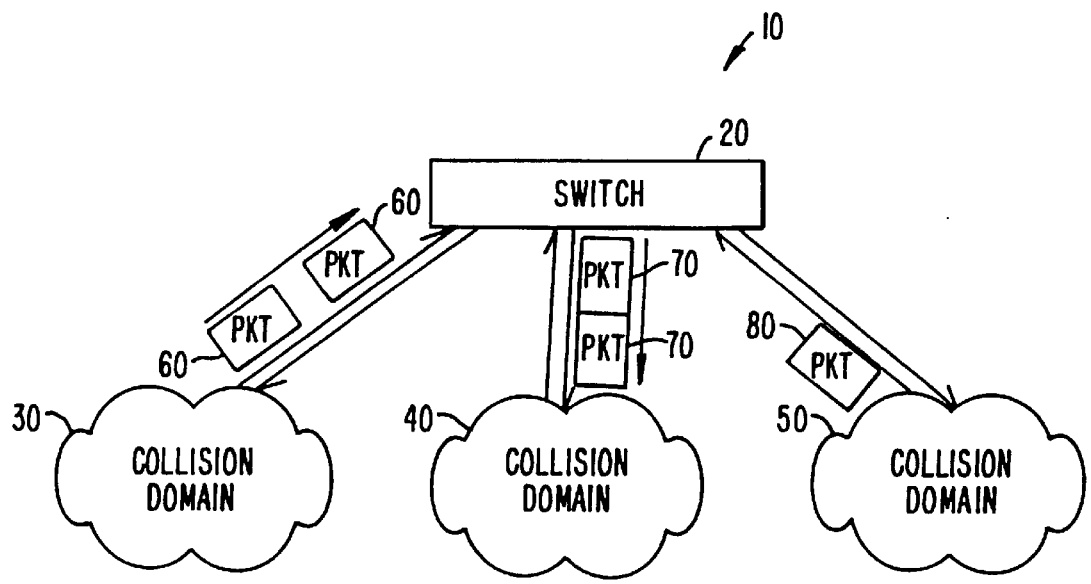
FIG. 3 is a block diagram of a multiple collision domain network having a switch to route inter-domain packets into the proper domain.

FIG. 3 is a block diagram of a multiple collision domain network 10 having a switch 20 to route inter-domain packets into the proper collision domain. Network 10 includes a first domain 30, a second domain 40 and a third domain 50 all coupled to a half-duplex port of switch 20. For purposes of FIG. 3, it is assumed that first domain 30 is transmitting a series of packets 60 to second domain 40 by routing them through switch 20. Switch 20 routes packets 60 into second domain 40 with the packets routed into domain 40 referred to as packets 70. For purposes of the following discussion, the concept of a switch is used in its broadest sense to refer to a inter-collision domain packet routing device, whether called a switch, hub, gateway, router, concentrator, or other term.

Initially, switch 20 sets up a communications channel between first domain 30 and second domain 40 in response to destination address information contained in the destination address field of the incoming packets 60. The process of sending packets from one collision domain into another conforms to the IEEE 802.3 standard. While one of packets 60 is transmitted from first domain 30 into second domain 40 through switch 20, third domain 50 may attempt to transmit a packet 80 into first domain 30 or second domain 40. It is possible for third domain 50 to send packet 80 into one of the other domains while it is transmitting because third domain 50 does not receive information about network activity from the other collision domains.

Upon receiving packet 80, switch 20 determines whether packet 80 is a valid packet and destined for an end-station in a collision domain other than third domain 50. Whenever packet 80 is destined for another collision domain, switch 20 determines whether the desired domain is busy.

To simplify explanation, it is assumed that packet 80 is to be transmitted into second domain 40. If the desired domain is busy when packet 80 is received at switch 20, switch 20 may have some memory available to buffer packet 80 until it can send packet 80 into second domain 40. For a cost-competitive switch however, the amount of buffer memory is necessarily limited and in some circumstances, switch 20 will not be able to buffer packet 80. A conventional switch is unable to adequately control third domain 50 through a flow control mechanism to have third domain 50 suspend transmission of packet 80 into second domain 40. Packet 80 is therefore transmitted and lost. The physical layer of a conventional system must rely on higher level error detection and correction mechanisms to recover from this type of error condition. This can lead to significant performance degradation.

Figure 4:
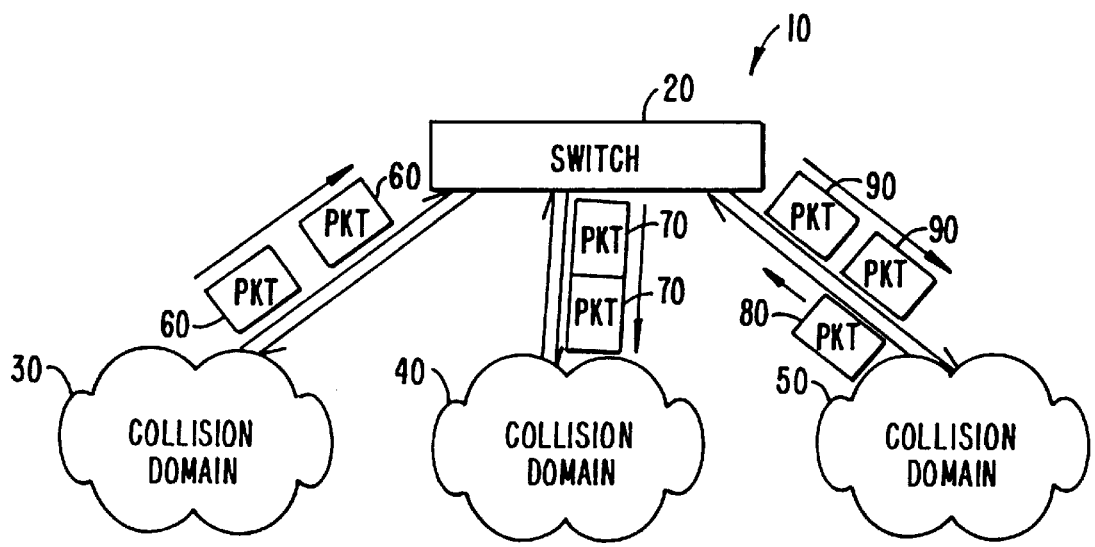
FIG. 4 is a block schematic diagram illustrating application of backpressure to one collision domain when a receiving collision domain is busy.

FIG. 4 is a block schematic diagram illustrating application of backpressure to third domain 50 in response to transmission of packet 80 to a receiving domain that is busy. Switch 20, after determining that packet 80 must be blocked (because switch 20 cannot buffer or forward packet 80 to second domain 40), switch 20 applies backpressure into third domain 50. Backpressure, in the form of a phantom data packet 90 for the preferred embodiment, is sent from switch 20 into third domain 50. Phantom packet 90 may be virtually any type of packet, and is referred to as a phantom packet because, in the preferred embodiment, it is generated by switch 20 and does not otherwise exist in network 10. A requirement for phantom packet 90 is that receipt of phantom packet 90 in third domain 50 while packet 80 is being transmitted to switch 20 triggers a collision condition in third domain 50.

Third domain 50 responds to a collision condition according to IEEE 802.3 that is desirable by either suspending transmission of packet 80 or retransmitting packet 80 in well-known fashion conforming to IEEE Standard 802.3. In the simplest implementation, switch 20 will apply backpressure, in the form of a single phantom packet 90, to third domain 50 every time it detects receipt of packet 80 and needs to block its receipt (e.g., buffering is unavailable and the desired domain is busy). Third domain 50 responds to phantom packet 90 by implementing a back-off algorithm that randomly assigns a delay before third domain 50 is able to reattempt transmission of packet 80. For certain applications, this simple type of flow control will be sufficient.

For other applications, the flow control procedure described above does not provide a complete solution. In some instances, the desired domain may receive a long succession of data packets. Without coordinating when third domain 50 reattempts the transmission of packet 80, there is a low probabilistic chance that packet 80 is received at switch 20 during an inter-packet gap (IPG) of a train of packets 60 transmitted into second domain 40. The standard back-off algorithm decreases the likelihood that packet 80 is received during an IPG in that each subsequent failure to transmit packet 80 without a collision being detected results in increasing delays. The reason that the likelihood decreases is because the back-off algorithm increases the range of possible back-off delays which must elapse prior to the next transmission attempt for each collision on packet 80 caused by phantom packet 90. The IEEE 802.3 Standard only permits sixteen failures (collisions) on a particular transmission attempt before terminating the process and asserting a retry error.

In order to effectively circumvent this limitation, the preferred embodiment does more than simply send a single phantom packet 90 to third domain 50. Switch 20 actually creates a logical collision domain of the three collision domains involved. In other words, switch 20 creates a single logical collision domain by combining first domain 30, second domain 40 and third domain 50. To do this, switch 20 issues a series of phantom packets 90 as a carrier activity signal during the duration of a transmission of data packet 60 from first domain 30. The first of the series of phantom packets 90 initiates the back-off algorithm. The subsequent transmission of phantom packets 90 is detected by third domain 50 as carrier activity, inhibiting third domain 50 from reattempting transmission of packet 80 until the carrier activity ceases. As the carrier activity ceases when the communication channel between first domain 30 and second domain 40 is idle and second domain 40 is able to accept packet 80, third domain 50 has a chance to aggressively contend for access to second domain 40.

The use of the logical collision domain for domains involved in a current transaction and those attempting to enter into communication with one of the involved domains greatly improves flow control and accessibility/performance of network 10 as third domain 50 aggressively contends for second domain 40. In the case where first domain 30 is monopolizing second domain 40, such as with a burst transfer, third domain 50 may still have a difficult time accessing second domain 40. The reason is due to the back-off algorithm. All DTEs in all collision domains each include an IPG counter that controls a minimum gap between transmission of packets. Implementation of the IEEE 802.3 Standard requires that a DTE not begin its IPG counter until after completion of the carrier activity. Therefore, for back-to-back transmissions by first domain 30 to second domain 40, it is possible that access by third domain 50 to second domain 40 is not strictly fair. To improve fairness and to provide enhanced functionality, switch 20 implements a prioritization mechanism to control access of any collision domain to another collision domain.

In the preferred embodiment, this prioritization mechanism includes a plurality of throttle counters (not shown), one for each port. When switch 20 applies backpressure into a collision domain, the throttle counter associated with that collision domain is incremented. The count of the throttle counter is available to switch 20 when determining priority issues. After a successful transmission of packet 80 to second domain 40, switch 20 clears the throttle counter and dismantles the logical collision domain.

To effectively implement the prioritization mechanism, switch 20 asserts backpressure to each collision domain that has a packet destined for a currently busy destination domain until the destination domain is idle. Then switch 20 awards access to the destination domain (second domain 40 in the present example) by relieving the backpressure applied to the collision domain (third domain 50) that has a packet to transmit into the destination domain.

While the example of the preferred embodiment assumes that packet forwarding is based on destination address, this is considered as the minimal capability of the switch, which essentially performs the forwarding actions expected of a bridge (other actions, such as implementation of the Spanning Tree algorithm to avoid duplicate paths would also be provided in a bridge). However, other forwarding decision criteria, such as protocol routing, security, and Virtual LAN (VLAN) administration (the creation of broadcast domains using source/destination address pairing) may be used as an alternative or an addition to the basic destination address forwarding decision. Regardless of the forwarding algorithm, the preference is to perform the forwarding decision in a timely manner, such that if an output port or internal switch resource is not available (blocked), the backpressure can be applied by the receive port of the switch and will arrive at the sourcing station before the normal collision window (slot time) of 512 bit times has elapsed.

In the preferred embodiment, the throttle count is used when awarding priority. As the throttle count gets closer to the sixteen packet retry limit, awarding access to third domain 50 becomes increasingly urgent. Switch 50 may include other prioritization algorithms that provide enhanced access to certain ports (port number) or end-stations (source address of packet).

In the preferred embodiment, when two input ports become active within a predetermined time, the Throttle Count value is read from the MAC at each associated port, and priority is awarded to the receive port with the highest (or a predetermined) value of Throttle Count. A period for receive packets arriving to be considered effectively simultaneously received can be made programmable, to allow input ports to contend for output ports as late as possible to maximize fairness.

In the preferred embodiment, the start of phantom packet generation is made programmable. Since generation of a phantom packet occurs at a point in the early stages of the packet (at some point within the slot time), this effectively makes the logical span of the collision domain appear larger than its physical span, In effect, the delay in the generation of the phantom collision appears at the sourcing end-station as additional round trip delay. To allow various topologies to be accommodated under the switch port, it is necessary that the start of the phantom packet generation be programmable, although a reasonable default would normally be used. In the event that an extended topology were required, the time to the start of phantom packet generation would be reduced, to avoid potential late collision problems.

The preferred embodiment is able to control the content and/or duration of the phantom packet to enhance robustness of the system. The actual data contained in a phantom packet in a half-duplex implementation is arbitrary. It is desirable, however, that the device receiving a phantom packet not interpret the data as a valid packet. One way of ensuring this is to simply make a phantom packet have only a preamble (alternating "1" and "0"). While such a simple phantom packet may be adequate for link segments (such as 10BASE-T), there is a chance that such a phantom packet is unsuitable for a mixing segment (such as 10BASE2). Thus, for certain applications, the phantom packet should be interpreted as either a runt (the phantom packet must have less than 576 bits including preamble) or that a legal length phantom packet have an invalid CRC value.

In the preferred embodiment, it is an option that the phantom packet have a programmable size. In one mode, phantom packet generation ensures that every generated phantom packet is a runt. Runt packets are naturally rejected by receivers as invalid packets. The phantom packet generation is also programmable to continue a phantom packet for as long as the destination domain is busy.

Thus, the preferred embodiment includes an option of providing a compromise that generates, as backpressure, a phantom packet as a normal preamble sequence for the duration that the destination domain is busy. As a programmable option, the phantom packet is segmented into multiple smaller packets (phantom runts) that are successively transmitted closer together than permitted (i.e., the IPG between two phantom runts is illegally short). This type of backpressure ensures that the device having flow control applied to it first detects a collision, followed by a short period of silence, then before reaching the first part interframe spacing (IFS), the receiver detects carrier activity and will back-off. As each phantom runt is rejected by a receiving media access controller (MAC) due to invalid packet size, there is little requirement to create illegal CRC values.

Figure 5:
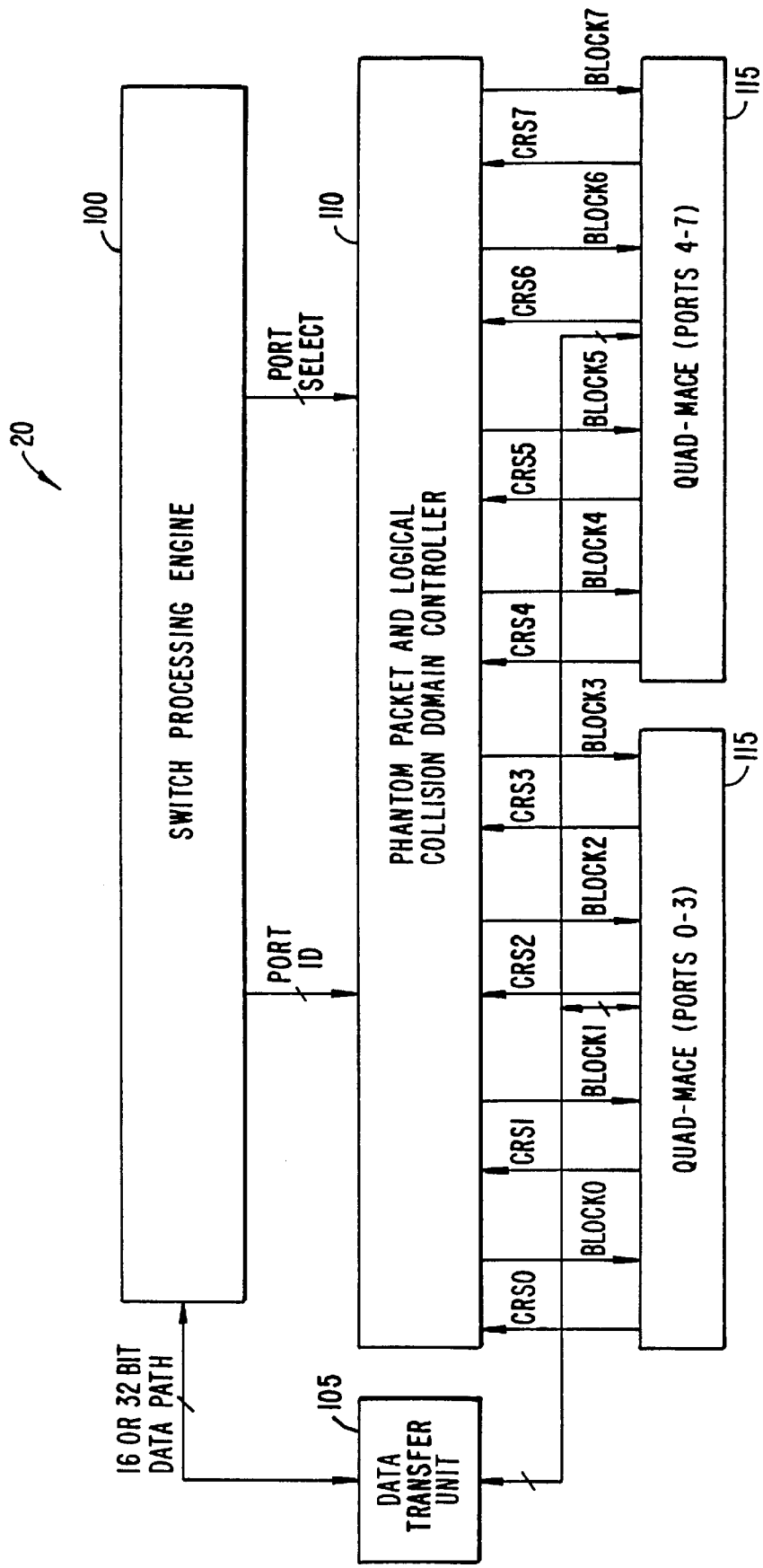
FIG. 5 is a block schematic diagram of a switch incorporating a preferred embodiment of the present invention.

FIG. 5 is a block schematic diagram of switch 20 incorporating a preferred embodiment of the present invention. Switch 20 includes a switch processing engine 100, a data transfer unit 105, a phantom packet and logical collision domain logic 110 and a pair of QUAD integrated Ethernet MAC devices 115 (four MACs per integrated package 115). Switch 20 thus provides an 8 port switch configuration. QUAD MAC 115 is a modified version of the QUAD-MACE chip that is commercially available from Advanced Micro Devices, Inc., of Sunnyvale, Calif.,P/N AM79C944. The presently available specification for the QUAD-MACE is hereby expressly incorporated by reference for all purposes.

The QUAD-MACE is modified by adding two pins per port, one output pin (CRSx) that is asserted when the corresponding port x is busy (transmitting or receiving) and an input pin for receiving a BLOCKx signal. When the BLOCKx signal is asserted, port x asserts backpressure for as long as the BLOCKx signal remains asserted.

When a packet is received at port x, switch processing engine 100 reads the start of the incoming packet from port x of the appropriate MAC 115. If, after performing a look-up to determine the physical destination port, port y, the determination is that port y is already busy, the switch processing engine 100 writes the active input port as a 3-bit PORT ID code, to the logical collision domain controller of the appropriate output port y. The logical collision domain controller is selected using the 3-bit PORT SELECT code. Each port has an associated 3-to-8 line decoder (See FIG. 6 below). When the Port ID is written out, a CRS output (in this case indicating a transmit or receive state of port y) is asserted to port x as the BLOCK signal. Switch processing engine 100 maintains this configuration until port x is successful in transmitting to port y. Note that a CRS output of a port is not fed back to the BLOCK input of the same port. It is assumed that switch processing engine 100 takes appropriate action when the incoming packet on a port is physically addressed to itself, and hardware blocking will not be performed.

Figure 6:
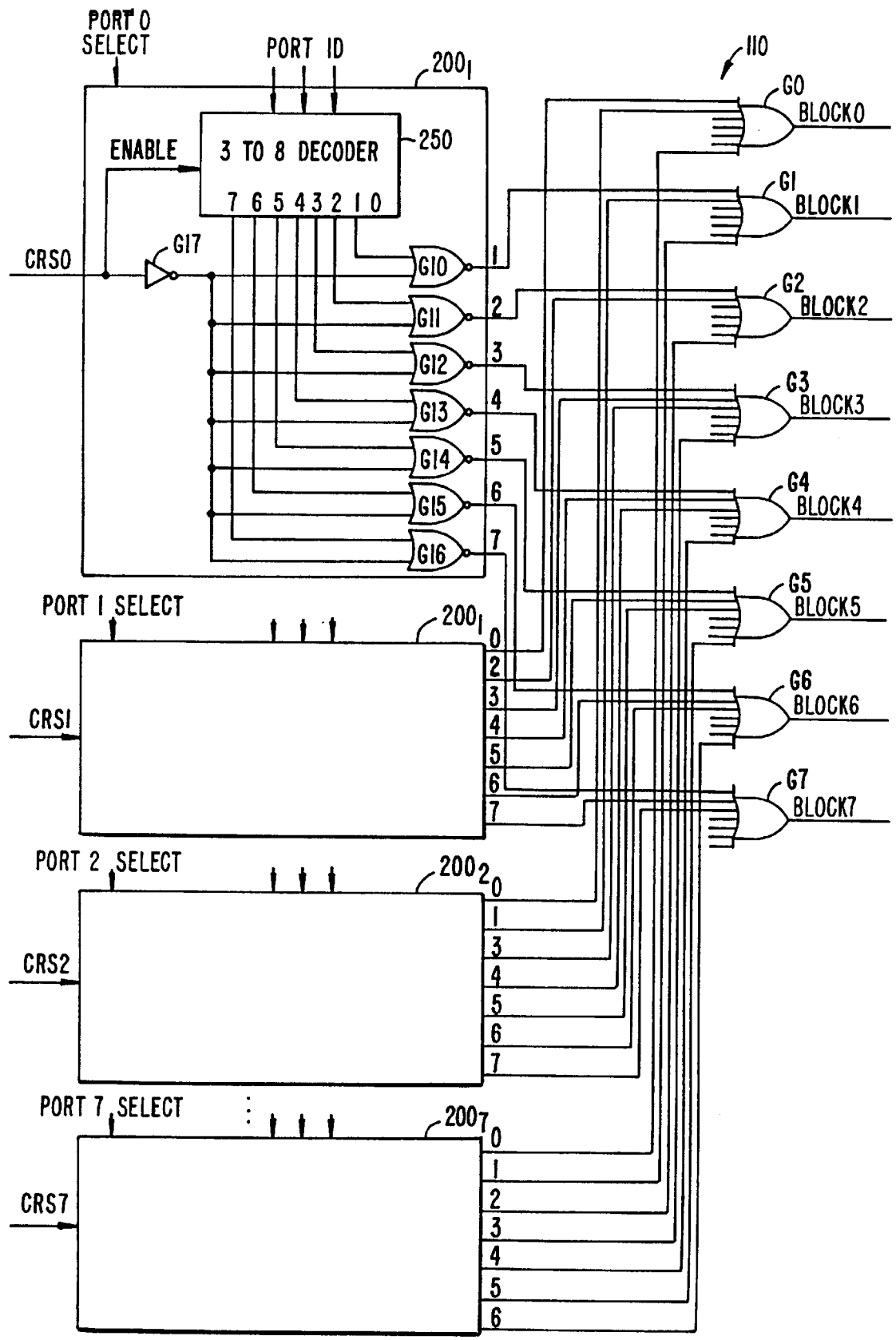
FIG. 6 is a detailed logic diagram for a switch fabric that supports backpressure and logical collision domain.

FIG. 6 is a detailed logic for a switch fabric that supports backpressure and logical collision domains. Phantom packet and Logical Collision domain controller 110 includes, for an eight port switch, eight port x receive packet destination decoders 200x (one per port) and eight blocking 7-input OR gates (G0–G7). Each decoder 200x receives CRSx from a MAC 115 and, in response to a decoded PORT ID signal identifying port y, asserts a decoder output signal DECODEy when CRSx is asserted. Corresponding DECODEy signals from decoder 200x (i.e., those that identify port y) are each provided to one input of the corresponding blocking OR gate Gy.

Each decoder 200x includes a 3-to-8 decoder 250, seven dual-input NOR gates (G10–G16) and an inverter G17. For decoder 200x, CRSx is input to inverter G17. An output of inverter G17 is coupled to a first input of each gate G10–G16. An output of NOR gates GX provides the DECODEy signal. The CRSx input is also provided to an enable input of decoder 250. Decoder 250, responsive to the PORT ID signal and assertion of the enable signal, converts a bit code identifying the active receiving port to an eight bit code. One of each of the bits of the converted PORT ID code is coupled to one of the second inputs of the NOR gates G10–G16.

For instance, if port 0 is an active receiver and the identified destination output port is port 7 (assume CRS7 is asserted), then when the value 0 is written to port 7 receive packet destination decoder $200_7$, CRS7 is routed at DECODE0 to blocking OR gate G0. When DECODE0 is active (e.g., active CRS7 routed to G0), BLOCK0 is asserted, and a phantom packet is transmitted into the collision domain coupled to port 0 for as long as CRS7 remains asserted.

Note that the delay in deasserting the CRSx signal, caused by the delay path in the Logical Collision Domain Controller 110, can be minimized by ensuring that the MAC controlling the CRS signal deasserts it as quickly as possible. In addition, the delay can be mitigated completely if the CRSx signal is returned from a switch port that is transmitting. Since the transmitting MAC is aware of the end of the packet in advance (since it is stored in it's internal FIFO), a transmitting MAC can effectively advance the deassertion of it's CRS output (by a predictable time period) in relation to the actual packet completion. By making this CRS deassertion feature programmable, the logic delays can be eliminated, and in fact the station which is being blocked by the phantom packet, can be prioritized slightly. Dropping the CRSx indication early, deasserts the BLOCKx signal, and ceases the transmission of the phantom packet. Allowing this to occur at a previously blocked input port, slightly earlier than the carrier indication of the ports currently engaged in a packet transfer, allows the IPG timer of the previously blocked station to begin timing out, and allows the station to aggressively contend for the logical collision domain.

Switch processing engine 100 is assumed to be able to read the appropriate Throttle Count values when two input ports are active and simultaneously (or closely separated in time) request access to the same output resource. Switch processing engine 100 would then choose the port with the highest Throttle Count to be allowed to occupy the output port, while the port with the lower Throttle Count value would have its port ID written to the Logical Collision domain controller for the associated output port.

In conclusion, the present invention provides a simple, efficient solution to a problem of flow control in a half-duplex Ethernet switch. While the above is a complete description of the preferred embodiments of the invention, various alternatives, modifications, and equivalents may be used.

Modifications include creating the phantom packet with a specific preamble or SFD pattern, which identifies the packet as being a phantom. In addition, the phantom packet could be formed to contain data field(s) and a valid CRC so that information could be passed within the phantom packet, which may be useful to some devices (full duplex capable devices for instance). In addition, in a new installation, enhanced end stations could be deployed to react differently to the phantom packet. For instance, read and use the data passed within the phantom packet, or cease transmission for a specified period on receipt of the phantom packet. Resumption of transmission by the end station could be accomplished by either transmitting a "resume" message, or merely allowing the end station to resume transmission after a fixed or variable delay. Finally, although the phantom packet is used due to its simplicity and interoperablity with existing Ethernet communications systems, other derivatives of Ethernet or other communications systems may use an alternative signaling method to effectively indicate that the packet cannot currently be accepted, and that it should be re-tried after a suitable delay. Therefore, the above description should not be taken as limiting the scope of the invention which is defined by the appended claims.

What is claimed is:

1. A method of switching an input data packet received at a first port of a half-duplex Ethernet switch to a second port of the half-duplex Ethernet switch having a communication channel established between the second port and a third port of the half-duplex Ethernet switch, comprising the steps of:

determining whether to block the input data packet; thereafter providing a carrier sense signal derived from the communication channel to the first port; thereafter applying backpressure from the first port, by generating a backpressure packet from the first port to an end-station coupled to the first port that transmits the input data packet, when blocking is desired, wherein the switch includes a generator for generating said backpressure packet;

receiving the input data packet at the first port when the second port is available, wherein said receiving step determines the second port is available when said communication channel is closed; thereafter routing the input data packet from the first port to the second port;

counting a number of bit times that lapse on the first port when said determining step has determined that blocking is desired; and starting said generating step after said number of bit times exceed a predetermined threshold.

2. The switching method of claim 1 wherein said generator includes a memory for storing a value used as said predetermined threshold.

3. The switching method of claim 1 wherein said generator is coupled to a plurality of memories, one for each of the ports, each memory for storing a value used as said predetermined threshold.

4. The switching method of claim 2 further comprising the steps of:

writing said value into said memory prior to said generating step; and determining whether said number of bit times exceeds said value written into said memory in order to determine whether to begin said generating step.

5. The switching method of claim 3 further comprising the steps of:

writing said value into an associated one memory of said plurality of memories prior to said generating step; and determining whether said number of bit times exceeds said value written into said associated one memory in order to determine whether to begin said generating step.

6. The switching method of claim 1 where a time period is sufficiently long to allow fields other than a destination address field and a source address field of the input packet to be compared prior to blocking to permit routing decisions to be made by the switch.

7. A method of switching an input data packet received at a first port of a half-duplex Ethernet switch to a second port of the half-duplex Ethernet switch having a communication channel established between the second port and a third port of the half-duplex Ethernet switch, comprising the steps of:

determining whether to block the input data packet; thereafter applying backpressure from the first port when blocking is desired;

receiving the input data packet at the first port when the second port is available; thereafter routing the input data packet from the first port to the second port;

incrementing a count associated with the first port each time said backpressure applying step is implemented; and thereafter using said count to determine a priority in awarding access of the first port to the second port.

8. The switching method of claim 7 where a timer period is used to determine the backpressure count values of any ports being blocked, and where a particular port having a lowest count is prioritized and allowed to receive (and forward) the input data packet, while any other ports have backpressure applied.

9. The switching method of claim 7 wherein the backpressure count is cleared when the input data packet is successfully routed to the third part.

10. A method of switching an input data packet received at a first port of a half-duplex Ethernet switch to a second port of the half-duplex Ethernet switch having a communication channel established between the second port and a third port of the half-duplex Ethernet switch, comprising the steps of:

determining whether to block the input data packet; thereafter applying backpressure from the first port when blocking is desired;

receiving the input data packet at the first port when the second port is available; and thereafter routing the input data packet from the first port to the second port wherein said backpressure is applied by use of a transmitted backpressure packet that terminates transmission from an end-station coupled to a first collision domain coupled to the first port until a resume transmission packet is transmitted from the first port by the switch.

11. The switching method of claim 10 wherein said transmission packet is transmitted when the third port is available.

12. The switching method of claim 11 wherein said end-station of said first collision domain includes a resume timer that enables retransmission of the first data packet without receipt of the resume transmission packet from the switch.

13. A method of switching an input data packet received at a first port of a half-duplex Ethernet switch to a second port of the half-duplex Ethernet switch having a communication channel established between the second port and a third port of the half-duplex Ethernet switch, comprising the steps of:

determining whether to block the input data packet, wherein the decision to block is based upon a destination address port for the input data packet satisfying at least one of the following blocking conditions:

the third port physically receiving, the third port physically transmitting, the first port having insufficient input buffer space available, the third port having no output buffer space available, or another input port of the switch having been determined to have a higher priority for access to the third port; thereafter applying backpressure from the first port when blocking is desired;

receiving the input data packet at the first port when the second port is available; and thereafter routing the input data packet from the first port to the second port.

14. A method of switching an input data packet received at a first port of a half-duplex Ethernet switch to a second port of the half-duplex Ethernet switch having a communication channel established between the second port and a third port of the half-duplex Ethernet switch, comprising the steps of:

determining whether to block the input data packet; thereafter providing a carrier sense signal derived from the communication channel to the first port;

applying backpressure from the first port, by generating a backpressure packet from the first port to an end-station coupled to the first port that transmits the input data packet, when blocking is desired, wherein said backpressure packet is transmitted in response to a expiration of a programmable collision timer which ensures that less than 512 bit times occurs before a collision is detected at the backed off station coupled to the first port;

receiving the input data packet at the first port when the second port is available, wherein said receiving step determines the second port is available when said communication channel is closed; and thereafter routing the input data packet from the first port to the second port.

* * * * *